Oct. 6, 1959
D. H. WALKER
2,907,549
TENSIONING DEVICE
Filed April 14, 1955
2 Sheets-Sheet 1
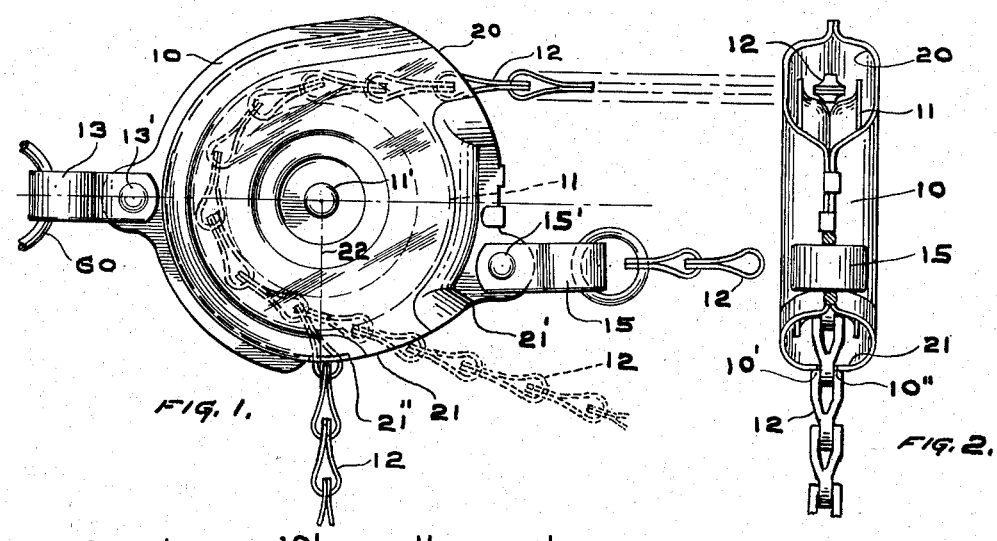
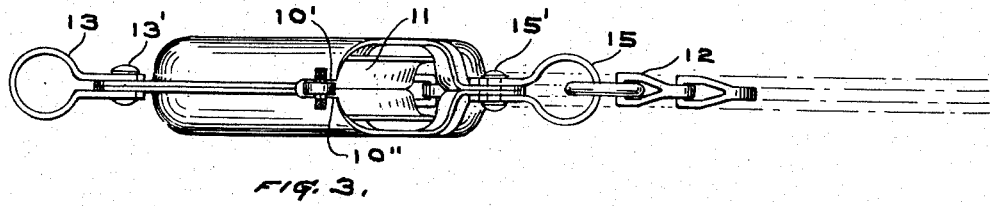
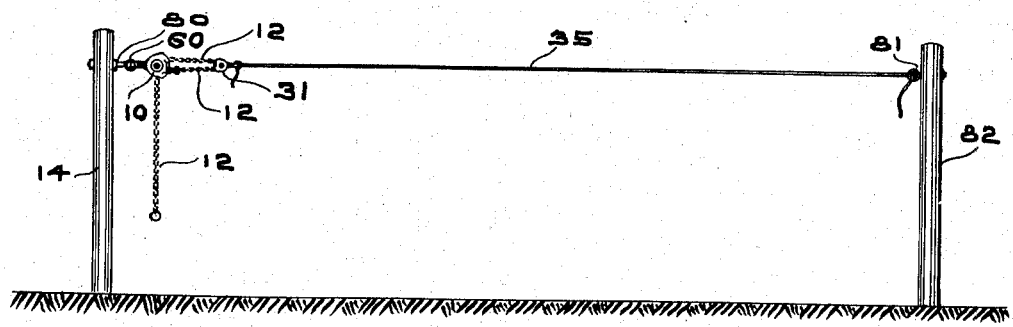
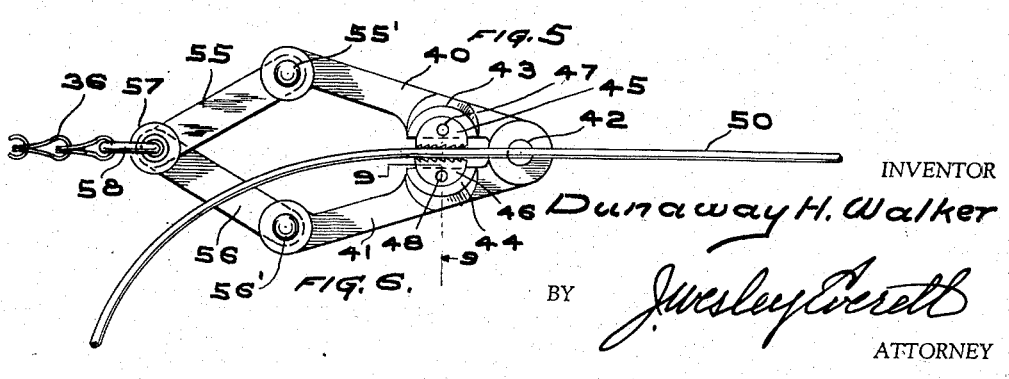
INVENTOR
Dunaway H. Walker
BY
J. Wesley Everett
ATTORNEY

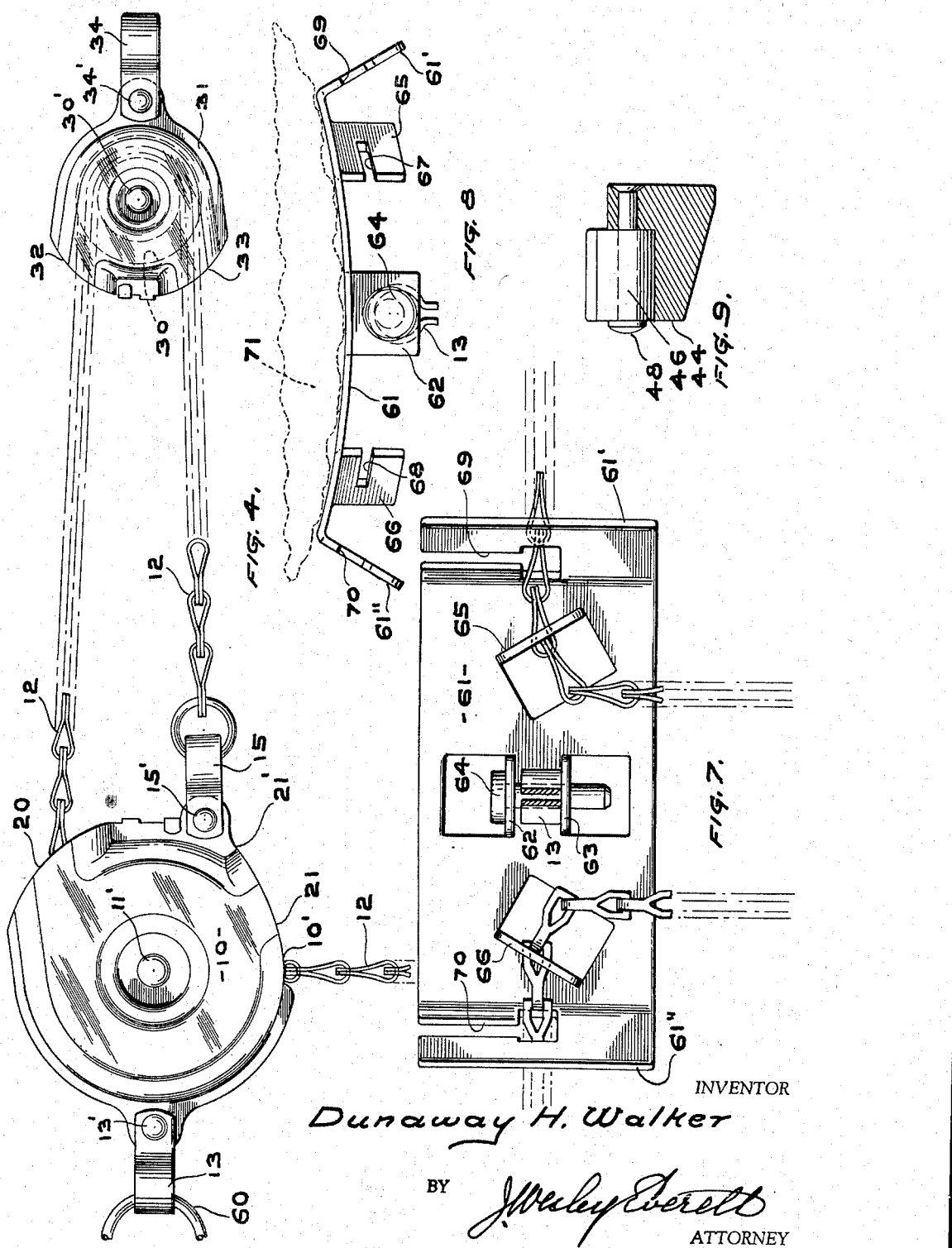

United States Patent Office 2,907,549
Patented Oct. 6, 1959

2,907,549

TENSIONING DEVICE

Dunaway H. Walker, Baltimore, Md.

Application April 14, 1955, Serial No. 501,409

1 Claim. (Cl. 254—65)

The present invention relates to a tensioning device for light lines, including wire, cord and the like, and is particularly adapted to tensioning of clothes lines. Clothes lines are made of various types of materials from wire to woven threads and the combination of these materials. The device is also applicable to stretching large tent ropes, particularly if the tent is of the type using a ridge rope upon which the tent is supported. In using this type tent the line is usually tightly drawn between two trees. The device is also useful for stretching light wire, such as for short sections of telephones or telegraph lines, or for stretching wire around plots of ground, gardens and the like, and is universally desirable for both professional and amateur workmen.

The primary object of the invention is to provide a simple and effective tensioning device, which is relatively light and may be used with very little effort and may be locked in any selected position.

Another object of the invention is to provide such a device that may be applicable to a large number of uses.

A further object of the invention is to provide a device that may be packed and stored in a very small place when not in use.

While several objects of the invention have been set forth, other objects, uses and advantages of the device will become more apparent as the nature of the device is more fully discolsed, consisting of its novel construction, combination and arrangement of parts which is shown in the accompanying illustrations and described in following detailed description. In the drawings:

Figure 1 is a side elevational view of one of the pulley blocks.

Figure 2 is an edge view of the same looking at the right edge of the block as shown in Figure 1.

Figure 3 is an inverted plan view of the block shown in Figure 1.

Figure 4 is a view showing diagrammatically the tensioning means in working position.

Figure 5 is an elevational view of the tension means illustrating its use in stretching a clothes line.

Figure 6 is an elevational view of one form of wire gripping means.

Figure 7 is an elevational view of a form of fastening means for fastening the device to a supporting member.

Figure 8 is a plan view of the same.

Figure 9 is an enlarged sectional view on line 9—9 of Figure 6.

In describing the invention like numerals are used to designate like and similar parts through the several views.

The term block is used in the present description to designate a pulley and a supporting housing therefor.

The device consists of two blocks, each having a rotatable pulley mounted therein. One of the blocks is designated as the primary block, which is the block fastened to a support, which is usually, a stationary member. This primary block comprises a housing 10, rotatably supporting a grooved pulley 11. The housing is preferably stamped from light metal, but may be of any suitable material such as plastic or the like. The housing substantially encloses the pulley 11 except for the openings for the pulley chain 12. The housing 10 is provided with a fastening means 13, which is attached to the housing by a pin 13'. This member 13 is used in attaching the block to a support such as a post 14, (as shown in Figure 5). On the opposite side of the housing and adjacent its lower side is a second fastening means 15 secured to the housing by the pin 15', to which one end of the pulley chain 12 is attached. As stated herein before the housing is provided with openings for the chain to enter and leave the housing in encircling the pulley 11. One of these openings is along the upper portion of the housing opposite the side from the fastening means 13, and is designated by the numeral 20. The other opening is on the same side of the housing at its lower edge and is designated by the numeral 21. This lower opening 21 extends from a point 21', just outside the point of the housing to which the fastening means 15 is attached and terminates at a point 21", which is slightly beyond a line extending outwardly from the axis of the pulley 11 perpendicular to a line 22 extending through the axis of the pulley 11 and the pin 13'. Extending beyond the opening 21 adjacent the end 21" is a slot formed by the sides of the housing at 10' and 10". This slot is of such width as to only accommodate the thin portions of the chain links 12 (as is well shown in Figure 3).

The chain illustrated herein is of a well known link type and is referred to by the trade as "sash chain." This chain is formed with an opening and bent around so that the end portions are made of two lapped portions in which there is an opening to receive the next link. The outer folded portions of the links in one direction are substantially narrower than the width of the lapped sections in one direction, and the lapped end sections are less in thickness than the folded portions in their other direction and it is these narrow portions only that are adapted to enter the retaining slot and therefore lock the chain to the housing preventing its further movement. However, other similar types of chain may be used, provided it may be locked within the slot within the housing.

The secondary block is made up of a pulley 30 rotatably mounted within a housing 31, similar to that described for housing 10 of the primary block. The housing 31 is provided with openings 32 and 33 for admitting the chain 12 to encircle the pulley 30. On the opposite side of the housing is a fastening means 34 which is secured to the housing by a pin 34'. The housing 31 also substantially encloses the pulley 30 and may be of any desirable material.

Secured to the member 34 is either a line 35 (see Figure 3) or a second chain, or lead member 36 (see Figure 6) which is in turn attached to a wire gripping means.

The gripping means is adapted to be used with wire or the like, and comprises a pair of links 40 and 41 hinged by a pin 42 at one end. Extending outwardly from the pin 42 is a pair of off-set portions 43 and 44, as shown also in Figure 9. These off-set portions are milled to present a circular surface into which gripping teeth with members 45 and 46 are journalled, the teeth members having corresponding circular bearing surfaces corresponding with those of the off-set members. The teeth members are pivotally mounted upon the pins 47 and 48 for the purpose of adjusting themselves to the different thickness of stock, or wire 50. The arm members 40 and 41 are pivotally connected to link members 55 and 56 by pins 55' and 56' which are in turn connected to each other at their opposite ends by a suitable pin 57. This pin 57 is preferably provided with an opening into which a ring 58 is inserted, connecting the gripping device with the chain or lead 36.

The primary housing may be secured to a post, or other supporting element by any convenient means which may extend through the opening in the member 13 such as the ring 60. However, if the object is of such a nature as to not lend itself to this type of fastening, there is provided an arcuated rectangular plate 61 having a pair of ears 62 and 63 stamped out of the plate and turned to form a bracket through which a pin 64 may be inserted through appropriate holes formed therein. The distance between these brackets is such as to receive the holding member 13. Also stamped out of the plate are ears 65 and 66. These ears are slotted at 67 and 68 which are of such width as to receive the thin portions of the chain links. The ends 61' and 61'' of the plate 61 are also bent outwardly out of the arcuated plate and are provided with slots 69 and 70 of such width as to allow the chain to slide therethrough. These slots lead inwardly from the narrow side of the plate to a point substantially half-way of the plate.

When the device is in use, such as for regulating the tension on a clothes line, the primary block is secured to a post, as shown in Figure 5. The ring 60 is carried by a staple 80 which is in turn mounted on the post 14. The member 34 of the secondary block is attached to a clothes line 35 while the opposite end of the clothes line is secured in an I bolt 81 secured in the post 82. In the beginning the secondary block is spaced outwardly from the primary block for a reasonable distance in order that the line 35 will be drawn taut as the secondary block is moved toward the primary block by pulling the free end of the chain 12 out of the slot and in the direction as shown by the dotted lines in Figure 1. When the line is of sufficient tightness the chain is brought down and toward the post 14. This action will cause the chain to engage the slot and hold the two blocks in their respective positions in relation to each other. When the line is to be loosened the same procedure is used in reversed order.

When the device is used on camping trips to stretch a tent ridge rope between two trees the plate 61 is used. This plate is placed against a tree (shown in fragmentary dotted lines in Figure 8 and designated by numeral 71). A chain is then wrapped around the tree and passed inwardly to the bottom of slots 69 and 70 and into the slots 68 and 67 in the members 65 and 66, which holds the bracket to the tree. It will be noted that the top of the members 65 and 66 slant inwardly toward the center of the bracket to cause the chain links to drop to the bottom of the slots 67 and 68 when any pull is put upon the bracket through the tensioning device.

The device has many and varied uses, a number of which have been enumerated, and the particular description and illustrations are not intended to limit the invention in any way, as the scope of the invention is best defined in the appended claim. Therefore, what is desired to be covered by Letters Patent is:

A pulley block and a link chain for tensioning line members having one end connected to the line member and its opposite end free for normally grasping, comprising, a substantially circular pulley supporting housing of thin sheet metal material having substantially flat parallel side sections and a pulley rotatably mounted centrally of the housing, the pulley having a channel about its face adapted to accommodate the link chain, the link chain having individual links of varying widths, means on one side of the housing for attaching the housing to a support, the opposite side of the housing having a chain inlet opening for admitting the end of the chain connected with the line under tension and an outlet opening for the free end of the chain, said openings being opposite the channel in the pulley for allowing the chain to pass freely in and around the pulley and out of the chain outlet opening, the outlet opening having an open end slot with parallel sides located in the central edge of the housing and centrally of the pulley channel and extending toward the means for attaching the housing to the support for engaging a chain link when the free end of the chain is moved into contact with the slot, the width of the slot being such as to allow only the narrower portion of the chain link to pass therein, whereby the sides of the slot engage the wide portion of the chain link beyond the slot adjacent the link extending into the slot for preventing the chain from further movements into the housing and around the pulley in the direction of the end of the chain attached to the line member under tension, the position of the slot being substantially in a line extending at right angles from the axis of the pulley and at right angles to a line passing through the means for connecting the housing to the supporting member and the axis of the pulley, at the center of the latter, whereby when the pulley is in a vertical position and the slot is positioned at the bottom of the pulley block, gravity tends to force the chain into the slot.

References Cited in the file of this patent

UNITED STATES PATENTS

| | | |
|---|---|---|
| 296,487 | Upton | Apr. 8, 1884 |
| 406,579 | Green | July 9, 1889 |
| 693,881 | Morgan | Feb. 25, 1902 |
| 814,139 | Johnson | Mar. 6, 1906 |
| 893,011 | Parker | July 14, 1908 |
| 1,124,522 | Rasmussen | Jan. 12, 1915 |
| 1,253,183 | Jones | Jan. 8, 1918 |
| 1,444,746 | McDonald | Feb. 6, 1923 |
| 1,542,548 | Gordon | June 16, 1925 |
| 1,648,803 | Gordon | Nov. 8, 1927 |